US010823846B2

(12) United States Patent
Takada

(10) Patent No.: US 10,823,846 B2
(45) Date of Patent: Nov. 3, 2020

(54) OBJECT DETECTION METHOD AND OBJECT DETECTION DEVICE

(71) Applicant: MITSUMI ELECTRIC CO., LTD., Tama-shi, Tokyo (JP)

(72) Inventor: Yuji Takada, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 268 days.

(21) Appl. No.: 16/032,211

(22) Filed: Jul. 11, 2018

(65) Prior Publication Data
US 2019/0018133 A1    Jan. 17, 2019

(30) Foreign Application Priority Data

Jul. 12, 2017  (JP) ................. 2017-136261

(51) Int. Cl.
G01S 13/04    (2006.01)
G01S 13/931   (2020.01)
G01S 13/56    (2006.01)
G01S 13/58    (2006.01)

(52) U.S. Cl.
CPC ............ *G01S 13/931* (2013.01); *G01S 13/04* (2013.01); *G01S 13/56* (2013.01); *G01S 13/584* (2013.01)

(58) Field of Classification Search
CPC ........ G01S 13/04; G01S 13/56; G01S 13/584; G01S 13/931
See application file for complete search history.

(56) References Cited

U.S. PATENT DOCUMENTS

2013/0162462 A1* 6/2013 Lehning .................. G01S 13/92
342/104

FOREIGN PATENT DOCUMENTS

JP    4850898 B2    1/2012
JP    4992367 B2    8/2012

* cited by examiner

Primary Examiner — Timothy A Brainard
(74) Attorney, Agent, or Firm — W&C IP

(57) ABSTRACT

In an object detection method, a moving speed $v_0$ of a radar device and an angle $\theta_1$ defined between a moving direction of the radar device and a reception direction of a radar wave reflected on a target are acquired, a first function which expresses a relative speed $v_1$ between the radar device and the target by the speed $v_0$ and the angle $\theta_1$ in a non-multipath environment model and a second function which expresses the speed $v_1$ in a multipath environment model are formed, an actual relative speed between the radar device and the target is calculated from a reception signal of the radar wave by using the multipath environment model, and it is determined that the reception signal is derived from a stationary object when a point defined by the $\theta_1$ and the actual relative speed is positioned between the first function and the second function.

5 Claims, 5 Drawing Sheets

US 10,823,846 B2

OBJECT DETECTION METHOD AND OBJECT DETECTION DEVICE

CROSS REFERENCE TO RELATED APPLICATIONS

This application is based on Japanese Patent Application (No. 2017-136261) filed on Jul. 12, 2017, the contents of which are incorporated herein by way of reference.

BACKGROUND

The present invention relates to an object detection method and an object detection device, and particularly to a technology of detecting a stationary object and a moving object, which is used in an on-vehicle radar device for example.

In the related art, an inter-vehicle distance sensor equipped with a radar device to detect a target such as a preceding vehicle is used in an adaptive cruise control (ACC) system. The radar device equipped in the inter-vehicle distance sensor emits a millimeter wave toward a front side of the vehicle, receives a radio wave reflected on the target, and mixes a reception signal generated from the received radio wave and a transmission signal to detect a relative distance and a relative speed of the target.

By the way, targets in such types of radar devices are generally objects such as a preceding vehicle which are moving (hereinafter, "moving object"), and stationary objects such as a guide rail are excluded from the targets. In this way, a calculation amount can be reduced, for example, by narrowing the targets to the moving objects.

JP-B-4992367 discloses a radar device (object detection device) which detects a stationary object. In addition, JP-B-4850898 discloses a radar device which determines whether a stationary object is a moving object, sets a beam received from the stationary object to an invalid beam, and sets a beam received from the moving object to a valid beam.

SUMMARY

According to first aspect of the present invention, there is provided an object detection method, including:

acquiring a moving speed $v_0$ of a radar device and an angle $\theta_1$ defined between a moving direction of the radar device and a reception direction of a radar wave reflected on a target;

forming a first function which expresses a relative speed $v_1$ between the radar device and the target by the moving speed $v_0$ and the angle $\theta_1$ in a non-multipath environment model and a second function which expresses the relative speed $v_1$ by the moving speed $v_0$ and the angle $\theta_1$ in a multipath environment model;

calculating an actual relative speed between the radar device and the target from a reception signal of the radar wave reflected on the target by using the multipath environment model; and determining that the reception signal is derived from a stationary object when a point defined by the angle $\theta_1$ and the actual relative speed calculated in the calculating is positioned between the first function and the second function.

The first function may be expressed as follows:

$$v_1 = v_0 \times \cos(\theta_1), \text{ and} \qquad \text{Expression 1}$$

the second function may be expressed as follows:

[Expression 2]

$$v_1 = \frac{v_0 \times (\cos(\theta_1) + \cos(\theta_2))}{2}.$$

In the determining, a value of $\cos(\theta_2)$ of Expression 2 may be fixed to any one value in a range more than or equal to −1 and less than or equal to 1, and it may be determined that the reception signal is derived from the stationary object when the point defined by the angle $\theta_1$ and the actual relative speed is positioned between Expressions 1 and 2.

In the determining, a value of $\cos(\theta_2)$ of Expression 2 may be fixed to 1, and it may be determined that the reception signal is derived from the stationary object when the point defined by the angle $\theta_1$ and the actual relative speed is positioned between Expressions 1 and 2.

According to second aspect of the present invention, there is provided an object detection device, including:

an acquisition part configured to acquire a moving speed $v_0$ of a radar device and an angle $\theta_1$ defined between a moving direction of the radar device and a reception direction of a radar wave reflected on a target;

a function forming part configured to form a first function which expresses a relative speed $v_1$ between the radar device and the target by the moving speed $v_0$ and the angle $\theta_1$ in a non-multipath environment model and a second function which expresses the relative speed $v_1$ by the speed $v_0$ and the angle $\theta_1$ in a multipath environment model;

a multipath relative speed calculation part configured to calculate an actual relative speed between the radar device and the target from a reception signal of the radar wave reflected on the target by using the multipath environment model; and a determination part configured to determine that the reception signal is derived from a stationary object when a point defined by the angle $\theta_1$ and the actual relative speed calculated in the multipath relative speed calculation part is positioned between the first function and the second function.

DETAILED DESCRIPTION OF EXEMPLIFIED EMBODIMENT

As described in JP-B-4992367, a signal of which the speed component is near zero is removed as a stationary object to extract a moving object from a radar signal, and a remaining signal is determined as a moving object.

Herein, in a case where the radar device itself moves, the speed component of the stationary object is not zero. Therefore, a relative speed is measured according to an angular direction between the stationary object and the radar device.

Thus, in a case where the speed $v_0$ of the vehicle, a measured angle $\theta_1$ of the stationary object, and the relative speed $v_1$ form a relation of $v_1=v_0\times\cos(\theta_1)$, the target can be determined as a stationary object.

However, the radar device is put under a so-called multipath environment in many cases where the radio wave is reflected on a guard rail. Therefore, under the multipath environment, a ghost is generated, the above relation is not established, and thus there is caused a problem when a stationary object is removed. In other words, a stationary object may be determined as a moving object. Specifically, for example, even though the guard rail is a stationary object, a reflection point of the guard rail may be considered as a moving object for the radar device.

Figure 1:
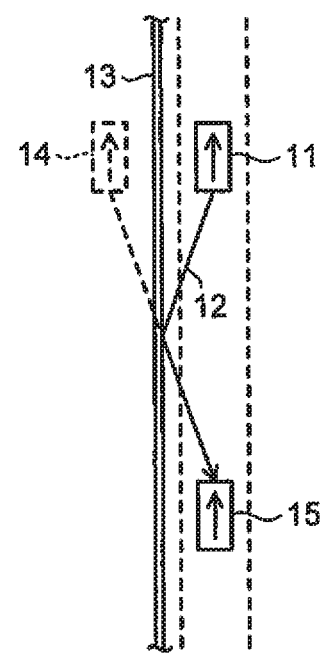
FIG. 1 is diagram for describing a ghost.

The ghost under the multipath environment will be simply described using FIG. 1. In an inter-vehicle distance sensor of a millimeter wave radar, if a radio wave 12 reflected on a preceding vehicle 11 is reflected on a wall 13 such as a tunnel wall, a soundproof wall, and a guard rail, a ghost 14 may appear in the wall as running.

In JP-B-4850898, a reception beam within an angle range of a ghost among reception beams within a predetermined angle range is set as an invalid beam. However, in such a case, if a moving object such as a pedestrian exists within the angle range of the invalid beam, there is a defect that the moving object is not possible to be detected.

The invention has been made in view of the above problems, and an object thereof is to provide an object detection method and an object detection device which can more accurately detect a stationary object and a moving object compared to the related art.

Hereinafter, embodiments of the invention will be described with reference to the drawings.

The principle of the embodiment will be described before a specific configuration of the embodiment is described.

If a transmission frequency of an FMCW (Frequency Modulated Continuous Wave) radar is set to $\omega_0+\omega_d t$, a phase is expressed as $\omega_0 t+\omega_d t^2/2+\phi_0$, so that a transmission signal TX(t) can be expressed as the following Expression (herein, ATX indicates an amplitude).

[Expression 1]

$$TX(t)=A_{TX}\cos(\omega_0 t+\omega_d t^2/2+\phi_0) \quad (1)$$

The transmission signal is delayed by time $\tau$ and a reception signal RX(t) is received, so that the reception signal can be expressed as follows.

[Expression 2]

$$RX(t)=A_{RX}\cos(\omega_0(t-\tau)+\omega_d(t-\tau)^2/2+\phi_0) \quad (2)$$

The transmission signal and the reception signal are mixed to form a local signal LO(t) as follows. However, the amplitude will not be used in the following signal processing, and thus will be ignored while set as "1".

[Expression 3]

$$LO(t)=TX(t)RX(t)\approx\cos(-\omega_0\tau+\omega_d\tau t-\omega_d\tau^2/2) \quad (3)$$

Figure 2:
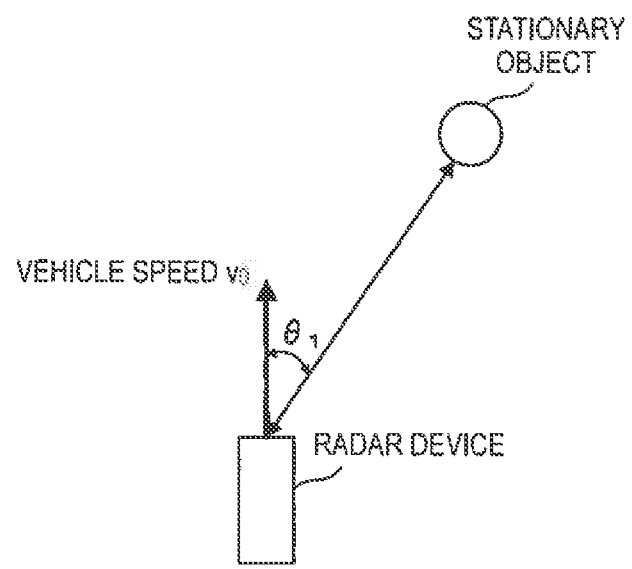
FIG. 2 is a diagram illustrating a reflection model from a stationary object in a case where it is not under a multipath environment (under a non-multipath environment).
Figure 3:
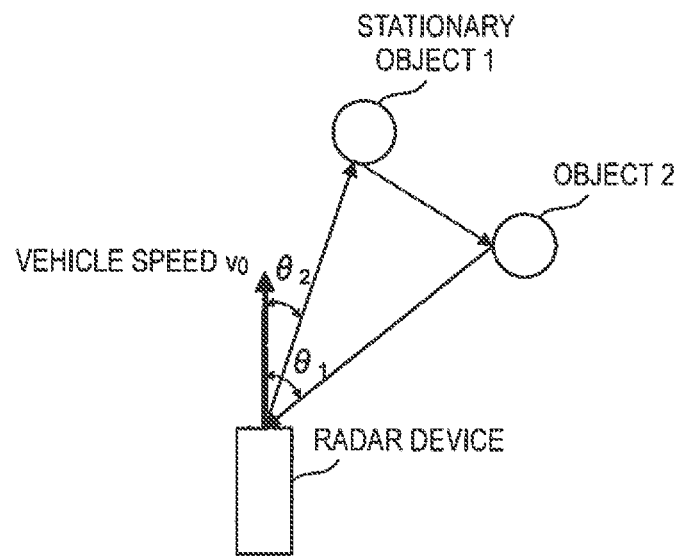
FIG. 3 is a diagram illustrating the reflection model under the multipath environment.

Herein, in this embodiment, it is determined using a model illustrated in FIGS. 2 and 3 whether a detected object is a stationary object. FIG. 2 illustrates a reflection model from the stationary object in a case where it is not under the multipath environment (the non-multipath environment). FIG. 3 illustrates the reflection model under the multipath environment.

"$v_0$" in the drawing represents a vehicle speed, thus the $v_0$ also represents a speed of a radar device equipped in the vehicle. "$\theta_1$" represents an angle formed between a moving direction of the vehicle (the radar device) and a reception direction. "$\theta_2$" represents an angle formed between the moving direction of the vehicle (the radar device) and a stationary object 1. In addition, the angle $\theta_2$ is an angle which is not actually possible to be measured.

It can be seen from FIG. 2 that a relative speed $v_1$ between a stationary object and the radar device in a case where it is not under a multipath environment can be expressed as follows.

[Expression 4]

$$v_1=v_0\times\cos(\theta_1) \quad (4)$$

In addition, it can be seen from FIG. 3 that the relative speed $v_1$ between the stationary object 1 and the radar device in a case where it is under the multipath environment can be expressed as follows.

[Expression 5]

$$\frac{v_0(\cos(\theta_1)+\cos(\theta_2))}{2} \quad (5)$$

In this embodiment, the following process will be performed to obtain a value of Expression (5). Assuming that "l" represents the number of chirps, and "$T_{PRI}$" represents a repetition time of chirps, a distance $R_1(t, l)$ to the stationary object 1 can be expressed as follows.

[Expression 6]

$$R_1(t, l) = \sqrt{(R_1\cos(\theta_1) - v_0 t - lv_0 T_{PRI})^2 + (R_1\sin(\theta_1))^2} = \\ \sqrt{R_1^2 - 2v_0 R_1\cos(\theta_1)t - 2lv_0 T_{PRI}R_1\cos(\theta_1) + 2lv_0^2 T_{PRI}t + v_0^2 t^2 + l^2 v_0^2 T_{PRI}^2} \quad (6)$$

Herein, when terms having small value and having less influence are omitted in Expression (6), an approximate value of Expression (6) becomes as follows.

[Expression 7]

$$R_1(t, l) \approx \sqrt{R_1^2 - 2v_0 R_1\cos(\theta_1)t - 2lv_0 T_{PRI}R_1\cos(\theta_1)} \approx \\ R_1 - v_0\cos(\theta_1)t - lv_0\cos(\theta_1)T_{PRI} \quad (7)$$

The transmission signal from the radar device is reflected on the stationary object 1, and further reflected on an object 2. A path length R (t, l) when the radar device receives the transmission signal can be expressed as follows.

[Expression 8]

$$R(t, l) \approx R_1(t, l) + R_{12} + R_2(t, l) \approx R_1 - v_0\cos(\theta_1)t - \\ lv_0\cos(\theta_1)T_{PRI} + R_2 - v_0\cos(\theta_2)t - lv_0\cos(\theta_2)T_{PRI} + R_{12} = \\ R_1 + R_{12} + R_2 - v_0(\cos(\theta_1) + \cos(\theta_2))t - T_{PRI}v_0(\cos(\theta_1) + \cos(\theta_2))l \quad (8)$$

A delay time $\tau$ can be expressed as follows (herein, c represents a radio wave propagation speed).

[Expression 9]

$$\tau = \frac{R(t, l)}{c} = \frac{R_1(t, l) + R_{12} + R_2(t, l)}{c} \quad (9)$$

Therefore, in the radar device of FIG. 3, a local signal LO (t, l) obtained by mixing the transmission signal and the reception signal can be expressed as follows.

[Expression 10]

$$LO(t, l) \approx \cos(-\omega_0 \tau + \omega_d \tau t - \omega_d \tau^2 / 2) \approx \quad (10)$$
$$\cos\left(-\frac{\omega_0(R_1(t, l) + R_{12} + R_2(t, l))}{c} + \frac{\omega_d}{c}(R_1(t, l) + R_{12} + R_2(t, l))t\right)$$

Herein, the relative speed can be calculated in the data processing in a direction of the repetition number l of chirps. Therefore, only the term related to "l" is extracted from Expression (10), and the following Expression is obtained.

[Expression 11]

$$LO_l = \cos\left(-\frac{\omega_0 T_{PRI} v_0 (\cos(\theta_1) + \cos(\theta_2))}{c} l\right) \quad (11)$$

Herein, $\omega_0$, $T_{PRI}$, and c in Expression (11) are known. Therefore, $v_0 (\cos(\theta_1)+\cos(\theta_2))$ can be obtained by a process such as FFT.

In this way, it is possible to calculate the relative speed $v_1$ in a multipath environment model from the reception signal.

Further, in a case where it is not under the multipath environment, $2v_0 \cos(\theta_1)$ is obtained if $\theta_1=\theta_2$. In general, $v_0 \cos(\theta_1)$ is divided by 2 in order to be a measured value.

In this embodiment, the calculation described above is performed in consideration of a case where $\theta_1$ is able to be measured while $\theta_2$ is not able to be measured actually. Therefore, an actual relative speed is calculated from the reception signal of the radar wave reflected on the target by the multipath environment model (that is, Expression (2)).

By the way, the above example has been described about the multipath in which a signal is reflected one time on the stationary object. Even in a multipath in which the signal is reflected two or more times on the stationary object, only an angle of a first reflection on an object and an angle of the last reflection on the object can appear. The reason is because the reflection with respect to the stationary object does not change in distance so that a speed component does not appear.

Figure 6:
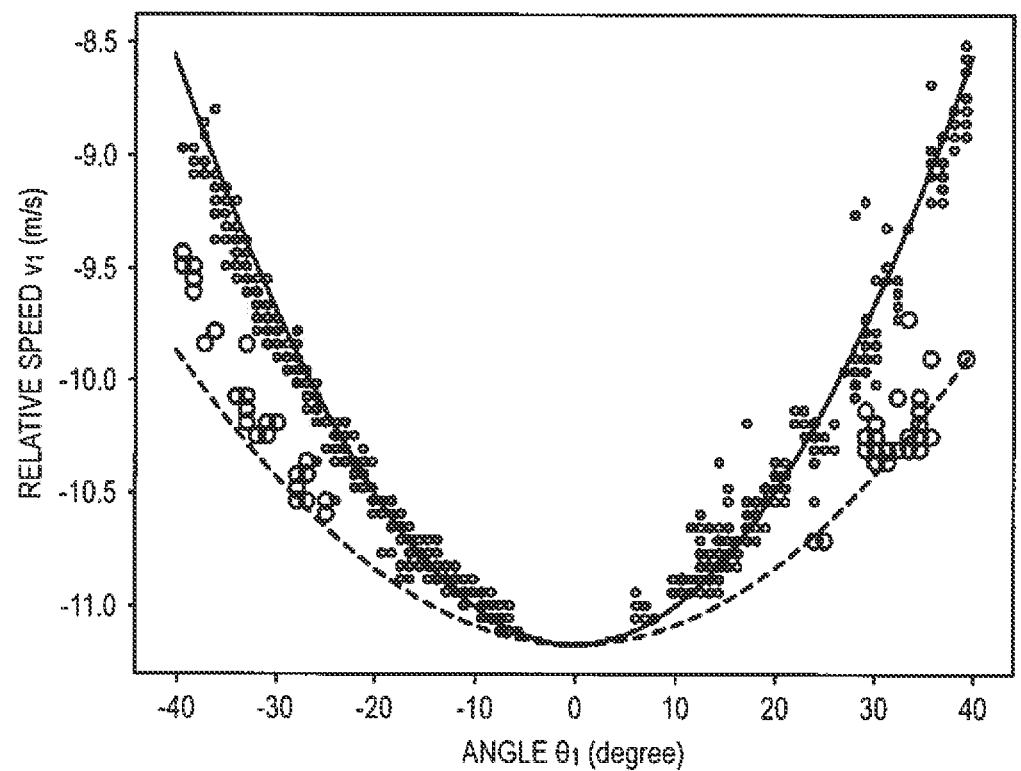
FIG. 6 is a diagram for describing a determination of the stationary object according to the embodiment.

FIG. 6 is a diagram for describing a determination on the stationary object according to this embodiment.

A solid line in the drawing indicates a function of a non-multipath environment model (that is, a function defined by Expression (4)). A dotted line of the drawing indicates a function of the multipath environment model (that is, a function defined by Expression (5)). However, since a variable $\theta_2$ is contained in Expression (5), the function is fixed to any one of values in a range of $-1 \leq \cos(\theta_2) \leq 1$ ($\cos(\theta_2)$ is equal to or more than $-1$, and equal to or less than 1). In this embodiment, the function is fixed to $\cos(\theta_2)=1$.

Then, in this embodiment, in a case where a point defined by the angle $\theta_1$ and the actual relative speed which is calculated from the reception signal by the multipath environment model (that is, Expression (2)) is positioned between the function of the non-multipath environment model depicted by the solid line in the drawing and the function of the multipath environment model depicted by the dotted line in the drawing, the reception signal is determined as from the stationary object.

By the way, a small circle in the drawing is a reception point from the stationary object under the non-multipath environment, which is measured in an experience. A large circle is a reception point from the stationary object under the multipath environment, which is measured in an experience. It can also be seen from the drawing that a point defined by the angle $\theta_1$ and the actual relative speed obtained from the reception signal of the stationary object is positioned between the relative speed $v_1$ in the non-multipath environment model and the relative speed $v_1$ in the multipath environment model. Accordingly, it can be understood that it is possible to determine that the reception signal is delivered from the stationary object by the above described determining step.

Figure 4:
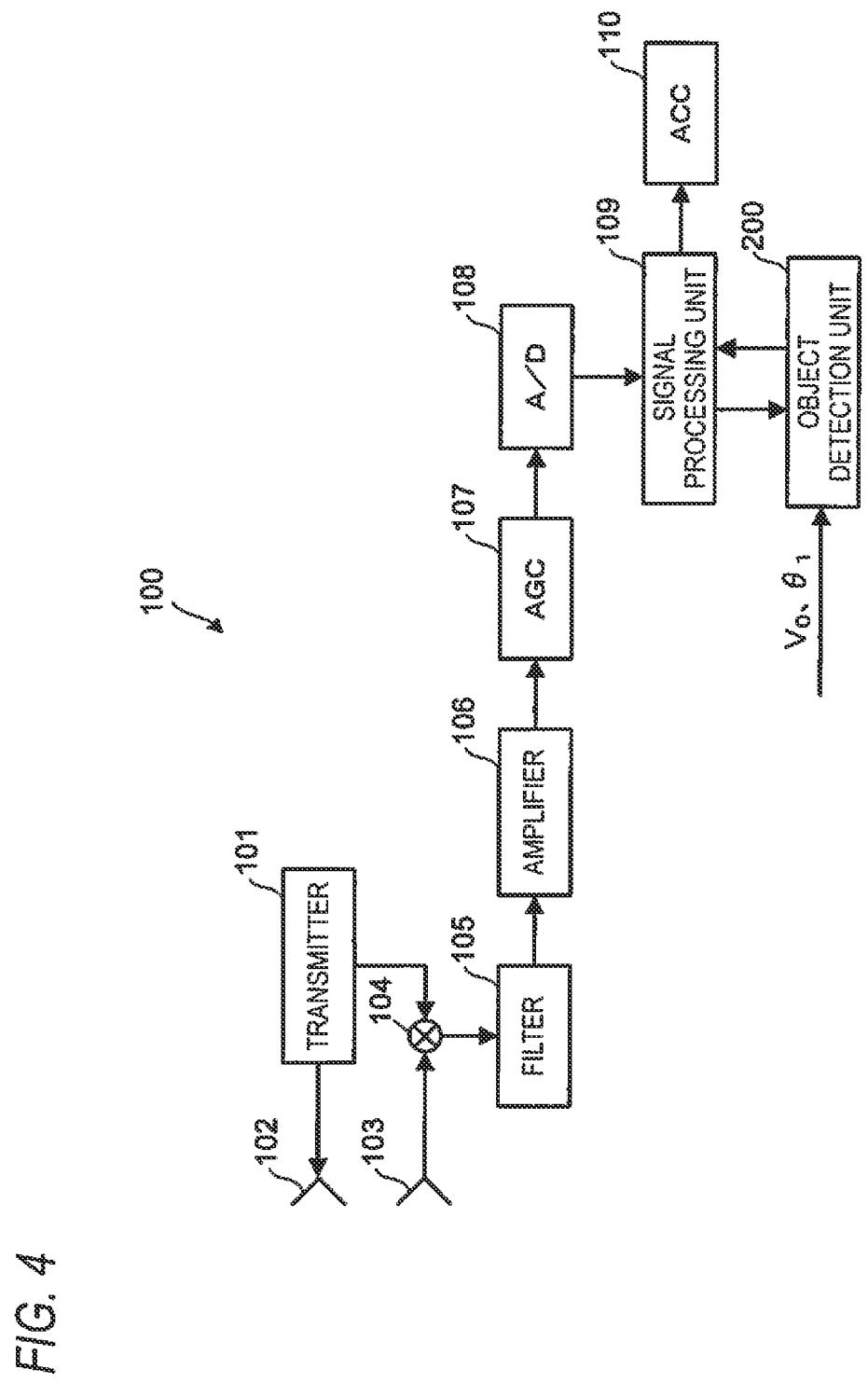
FIG. 4 is a diagram conceptually illustrating the entire configuration of a radar device according to an embodiment.

FIG. 4 is a diagram schematically illustrating the entire configuration of the radar device according to the embodiment. A radar device 100 includes a transmitter 101, a transmitting antenna 102, a receiving antenna 103, a mixer 104, a filter 105, an amplifier 106, an AGC (Auto Gain Controller) 107, an A/D converter 108, and a signal processing unit 109.

The transmitter 101 emits a millimeter wave signal obtained by modulating a ramp waveform from the transmitting antenna 102. A radio wave emitted at a predetermined beam angle from the transmitting antenna 102 is reflected on a target in a case where there is a target such as a preceding vehicle. The receiving antenna 103 receives the radio wave reflected on the target. The received signal is mixed with a local oscillation signal from the transmitter 101 by the mixer 104, and is input to the signal processing unit 109 through the filter 105, the amplifier 106, the AGC 107, and the A/D converter 108.

The signal processing unit 109 calculates a relative distance, a relative speed, and a position with respect to each target. Further, these configurations and operations do not change from those of the radar device of the related art, and the detailed descriptions will be omitted. The signal processing unit 109 is connected to, for example, an ACC (adaptive cruise control device) 110. τ calculation result of the signal processing unit 109 is output to the ACC device 110. The ACC device 110 performs an automatic cruise control based on information of each target acquired from the radar device 100.

In addition, the radar device 100 includes an object detection unit 200. The object detection unit 200 detects a stationary object among the targets processed by the signal processing unit 109. Then, the object detection unit 200 outputs information indicating that a target is a stationary object to the signal processing unit 109. The signal processing unit 109 calculates a relative distance, a relative speed, and a position of a moving object except the stationary object among the processed targets, and outputs the calculated values to the ACC device 110.

In other words, the stationary objects such as a guard rail and a building is an object which is not such related to the control of a vehicle. Therefore, while those stationary objects are excluded, only a moving object is extracted as a target, and used as a target such as an emergency brake.

Figure 5:
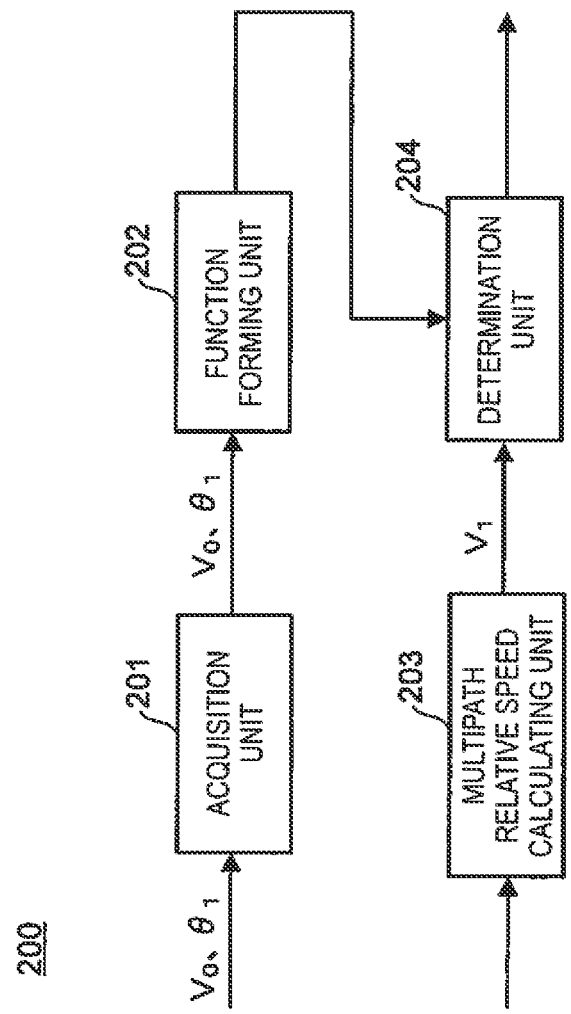
FIG. 5 is a block diagram illustrating an exemplary configuration of an object detection unit.

FIG. 5 is a block diagram illustrating an exemplary configuration of the object detection unit 200.

The object detection unit 200 includes an acquisition unit 201, a function forming unit 202, a multipath relative speed calculating unit 203, and a determination unit 204.

The acquisition unit 201 acquires a moving speed $v_0$ of a subject device (the radar device 100), and the angle $\theta_1$ formed by the moving direction of the subject device and the reception direction of a radar wave reflected by the target. Specifically, the moving speed $v_0$ is obtained by a vehicle speed sensor. The angle $\theta_1$ is obtained by a detection unit of an incoming direction of the reception signal.

The function forming unit 202 is configured by a table for example, and outputs the relative speed $v_1$ between the subject device and the target which is expressed using the moving speed $v_0$ and the angle $\theta_1$ with respect to the non-multipath environment model and the multipath environment model. Specifically, the function forming unit 202 outputs the function illustrated with the solid line (the function of the non-multipath environment model) and the function illustrated with the dotted line (the function of the multipath environment model) of FIG. 6.

The multipath relative speed calculating unit 203 calculates the actual relative speed from the reception signal by the multipath environment model. Specifically, the multipath relative speed calculating unit 203 calculates the actual relative speed by calculating the relative speed $v_1$ in the Expressions (1) to (11).

The determination unit 204 determines whether the reception signal is derived from the stationary object based on whether a point defined by the angle $\theta_1$ and the actual relative speed calculated by the multipath relative speed calculating unit 203 is positioned between the function of the non-multipath environment model (a first function) and the function of the multipath environment model (a second function). The determination unit 204 outputs a determination result to the signal processing unit 109. In this embodiment, the determination unit 204 determines that the reception signal is derived from the stationary object when the point defined by the angle $\theta_1$ and the actual relative speed calculated by the multipath relative speed calculating unit 203 is positioned between the function of the non-multipath environment model and the function of the multipath environment model.

As described above, according to this embodiment, (i) the moving speed $v_0$ of the subject device and the angle $\theta_1$ formed between the moving direction of the subject device and the reception direction of the radar wave reflected on the target are acquired, (ii) the relative speed $v_1$ between the subject device and the target is expressed by the function using the moving speed $v_0$ and the angle $\theta_1$ with respect to each of the non-multipath environment model and the multipath environment model, (iii) the actual relative speed is calculated from the reception signal by the multipath environment model, and (iv) it is determined whether the reception signal is derived from the stationary object based on whether the point defined by angle $\theta_1$ and the calculated actual relative speed is positioned between the function of the non-multipath environment model and the function of the multipath environment model. Therefore, it is possible to realize an object detection method and an object detection device which can more accurately detect a stationary object and a moving object compared to the related art.

For example, in JP-B-4850898, a beam in a certain angle range is removed as invalid beam. However, in this embodiment, a beam in a certain angle range and at a certain relative speed is determined as a stationary object, so that a moving object within the range can be detected. In other words, the method of this embodiment does not remove all the beams within a certain angle range as virtual images (ghost), but can detect an object in the range.

In addition, the method of this embodiment can predict a stationary object using a simple calculation expression without using a complex calculation expression.

The embodiments described above have been described as merely exemplary to implement the invention. A technical scope of the invention should not be interpreted in a limited way by these embodiments. In other words, the invention may be implemented in various ways within a scope not departing from the spirits or principal features.

The invention is not limited to an on-vehicle radar device, but may be applied to various radar devices. When applied to the radar device which is used under the multipath environment and moves (that is, $v_0 \neq 0$), the invention may achieve a significant effect. For example, the invention is desirably applied to a radar device which is mounted in an industrial robot or a drone.

According to the invention, it is possible to more accurately detect a stationary object and a moving object compared to the related art.

What is claimed is:

1. An object detection method, comprising:
   acquiring a moving speed $v_0$ of a radar device and an angle $\theta_1$ defined between a moving direction of the radar device and a reception direction of a radar wave reflected on a target;
   forming a first function which expresses a relative speed $v_1$ between the radar device and the target by the moving speed $v_0$ and the angle $\theta_1$ in a non-multipath environment model and a second function which expresses the relative speed $v_1$ by the moving speed $v_0$ and the angle $\theta_1$ in a multipath environment model;
   calculating an actual relative speed between the radar device and the target from a reception signal of the radar wave reflected on the target by using the multipath environment model; and
   determining that the reception signal is derived from a stationary object when a point defined by the angle $\theta_1$ and the actual relative speed calculated in the calculating is positioned between the first function and the second function.

2. The object detection method according to claim 1, wherein the first function is expressed as follows:

$$v_1 = v_0 \times \cos(\theta_1), \text{ and} \qquad \text{[Expression 1]}$$

[Expression 2]

$$v_1 = \frac{v_0 \times (\cos(\theta_1) + \cos(\theta_2))}{2}$$

wherein an angle $\theta_2$ is defined between the moving direction of the radar device and the target.

3. The object detection method according to claim 2, wherein, in the determining,
   a value of $\cos(\theta_2)$ of Expression 2 is fixed to any one value in a range more than or equal to −1 and less than or equal to 1, and
   it is determined that the reception signal is derived from the stationary object when the point defined by the angle $\theta_1$ and the actual relative speed is positioned between Expressions 1 and 2.

4. The object detection method according to claim 2, wherein, in the determining,
   a value of $\cos(\theta_2)$ of Expression 2 is fixed to 1, and it is determined that the reception signal is derived from the stationary object when the point defined by the angle $\theta_1$ and the actual relative speed is positioned between Expressions 1 and 2.

5. An object detection device, comprising:
an acquisition part configured to acquire a moving speed $v_0$ of a radar device and an angle $\theta_1$ defined between a moving direction of the radar device and a reception direction of a radar wave reflected on a target;
a function forming part configured to form a first function which expresses a relative speed $v_1$ between the radar device and the target by the moving speed $v_0$ and the angle $\theta_1$ in a non-multipath environment model and a second function which expresses the relative speed $v_1$ by the moving speed $v_0$ and the angle $\theta_1$ in a multipath environment model;
a multipath relative speed calculation part configured to calculate an actual relative speed between the radar device and the target from a reception signal of the radar wave reflected on the target by using the multipath environment model; and
a determination part configured to determine that the reception signal is derived from a stationary object when a point defined by the angle $\theta_1$ and the actual relative speed calculated in the multipath relative speed calculation part is positioned between the first function and the second function.

\* \* \* \* \*